No. 618,292. Patented Jan. 24, 1899.
J. E. RAUSHECK.
CULTIVATOR.
(Application filed July 13, 1898.)

(No Model.)

UNITED STATES PATENT OFFICE.

JOHN E. RAUSHECK, OF QUEEN CITY, TEXAS, ASSIGNOR OF ONE-HALF TO JOHN E. ELLINGTON, OF SAME PLACE.

CULTIVATOR.

SPECIFICATION forming part of Letters Patent No. 618,292, dated January 24, 1899.

Application filed July 13, 1898. Serial No. 685,862. (No model.)

*To all whom it may concern:*

Be it known that I, JOHN E. RAUSHECK, a citizen of the United States, residing at Queen City, in the county of Cass and State of Texas, have invented a new and useful Cultivator, of which the following is a specification.

My invention relates to cultivators, and has for its object to provide an improved agricultural implement of that class wherein the shovel-carrying oblique or angle beam intersects the main or draft beam at an intermediate point of the latter and wherein said main or draft beam extends rearwardly beyond said point of intersection of the oblique or angle beam to carry the handles, and thus give to the operator a leverage by which the cultivator may be controlled.

The object of my invention is to provide improved means for varying the angular adjustment of the oblique or angle beam with relation to the main or draft beam and at the same time to insure the positive bracing of the angle-beam in its adjusted positions against strains due to the contact of the shovels with the soil, and particularly is to provide an improved construction of interchangeable front blade, whereby an extension thereof performs the function of a front brace for the angle-beam, such front brace having an adjustable connection with the frame of the cultivator to facilitate the above-mentioned angular adjustment of the oblique beam.

Further objects and advantages of this invention will appear in the following description, and the novel features thereof will be particularly pointed out in the appended claims.

In the drawings, Figure 1 is a plan view of a cultivator constructed in accordance with my invention. Figs. 2 and 3 are respectively right and left side views of the same. Fig. 4 is a front view showing the main or draft beam and the upper portion of the interchangeable front blade in section upon a plane indicated by the line 4 4 of Figs. 1 and 2. Fig. 5 is a detail view in perspective of a portion of the front blade.

Similar numerals of reference indicate corresponding parts in all the figures of the drawings.

In the cultivator embodying my invention, 1 designates the main or draft beam, which at an intermediate point is fitted with a vertical king-bolt 2, forming the fulcrum and means of attachment to the main beam of an obliquely-disposed angle-beam 3, said king-bolt extending through a longitudinal slot in the angle-beam, which consists of spaced parallel members connected by transverse securing-bolts 4. The angle-beam members are provided in their facing surfaces with registering seats for the reception of the round shanks of cultivator blades or shovels 5. Diagonally-disposed wear-plates 6 are arranged in contact with opposite side surfaces of the angle-beam and are engaged by said securing-bolts, and these securing-bolts are arranged in pairs, with the members of each pair passing through the angle-beam in planes at opposite sides, respectively, of the adjacent shovel or blade shanks.

At the front end of the angle-beam one of the members is cut away to form a seat, in which is arranged the upper end of an interchangeable blade 7, whereby the outer surface of the shank of said blade is flush with the end of the beam to enable the operator by the position of the end of the angle-beam to ascertain exactly the position and point of operation of said front blade. In the construction illustrated the front blade is constructed to form a divider or colter and pulverizer; but, particularly in "second" cultivation or "second" plowing, an ordinary cultivating shovel or blade of a construction similar to the rear and intermediate shovels shown in the drawings may be substituted for that which is illustrated.

The upper end of the shank of the front blade is bent horizontally at the upper side of the angle-beam to form a transverse brace 8, which extends under the main or draft beam and is provided with a plurality of openings 9 for engagement by a vertical bolt 10, extending through the main or draft beam. The body portion of the shank of the front blade is secured in said seat at the front end of the angle-beam by a transverse bolt 11, and it is obvious that by engaging the bolt 10 with different perforations of the integral horizontal extension of said blade-shank and correspondingly varying the position of the angle-beam with relation to the main beam by turning the former upon the king-bolt as a center different relative adjustments of the main and angle beams may be secured to increase or diminish the width of the path or swath of the cultivator. In addition, however, to the brace above described for the front end of the angle-beam I employ a diagonal side brace 12, extending from the rear end of the angle-beam forwardly to the main beam at a point in advance of said front blade and engaged at its front end by a transverse bolt 13, which is adapted to take into either of a plurality of openings 14 formed in said brace 12. Obviously the adjustment of the front end of the brace 12 with relation to the main beam must be varied simultaneously with the adjustment of the brace by which the front end of the angle-beam is connected with the main beam for an analogous purpose. Also, a vertical brace 15 preferably extends from the lower end of the king-bolt at the under side of the angle-beam forwardly to the under side of the main or draft beam.

In addition to the above-described construction I have provided by the extension of the main beam in rear of the point of intersection of the angle-beam therewith for the attachment of the handles 16 to the main beam in rear of said angle-beam, whereby the operator obtains a leverage in manipulating the cultivator which facilitates the guidance thereof with the minimum exertion. These handles preferably rise from the extreme rear end of the main or draft beam, as illustrated in the drawings.

Owing to the round shanks of the cultivator blades or shovels the angular adjustment thereof is facilitated to present the desired surface to the front, and in practice I preferably construct the intermediate shovel or blade of larger area than the terminal blades or shovels of the series, irrespective of the front blade, as shown in Fig. 4; but a broader blade or that of greater area may be interchanged with the blade in advance thereof when it is desired to throw a greater amount of earth toward the row which is being hilled or cultivated. It will be understood that the front blade, which I have termed a "colter," is designed to loosen and pulverize the earth and supply soil to the foremost cultivator-blade 5, and this earth thus supplied to the foremost cultivator-blade is carried inwardly or toward the row which is being cultivated by passing successively to the remaining blades 5.

Various changes in the form, proportion, and the minor details of construction may be resorted to without departing from the spirit or sacrificing any of the advantages of this invention.

Having described my invention, what I claim is—

1. In a cultivator, the combination of a main or draft beam, a shovel-carrying angle-beam secured to and carried by the main beam and extending terminally in opposite directions from the plane of the main beam, and a front blade seated in and flush with the front extremity of the angle-beam, substantially as specified.

2. In a cultivator, the combination of a main or draft beam, a shovel-carrying angle-beam secured to and carried by the main or draft beam, a front blade seated upon the front end of the angle-beam and having a horizontal transverse extension intersecting the plane of the main or draft beam, and means for securing said extension of the front blade to the main beam, substantially as specified.

3. In a cultivator, the combination of a main or draft beam, a shovel-carrying angle-beam pivotally secured to and carried by the main beam, a front blade secured to the front end of the angle-beam and provided with a transverse horizontal extension intersecting the plane of the main beam and provided with a plurality of openings, and a bolt carried by the main beam for engaging one of the openings in said extension, to secure the angle-beam at different angular adjustments, substantially as specified.

4. In a cultivator, the combination of a main or draft beam, a shovel-carrying angle-beam pivotally secured to and carried by the main beam, a front blade seated upon the front extremity of the angle-beam and having a transverse horizontal extension forming a brace intersecting the plane of the main beam, adjustable means for securing said extension to the main beam, a diagonal brace extending from the rear end of the angle-beam to the main beam in front of the point of intersection of the angle-beam, and adjustable means for securing said braces to the main beam, substantially as specified.

In testimony that I claim the foregoing as my own I have hereto affixed my signature in the presence of two witnesses.

JOHN E. RAUSHECK.

Witnesses:
CHAS. T. CUMMINGS,
W. C. POWELL.